United States Patent
Jindal et al.

(10) Patent No.: US 11,875,781 B2
(45) Date of Patent: Jan. 16, 2024

(54) AUDIO-BASED MEDIA EDIT POINT SELECTION

(71) Applicant: Adobe Inc., San Jose, CA (US)

(72) Inventors: Amol Jindal, San Jose, CA (US); Somya Jain, Uttar Pradesh (IN); Ajay Bedi, Himchal Pradesh (IN)

(73) Assignee: Adobe Inc., San Jose, CA (US)

( * ) Notice: Subject to any disclaimer, the term of this patent is extended or adjusted under 35 U.S.C. 154(b) by 104 days.

(21) Appl. No.: 17/008,427

(22) Filed: Aug. 31, 2020

(65) Prior Publication Data

US 2022/0068258 A1   Mar. 3, 2022

(51) Int. Cl.
*G10L 15/04*   (2013.01)
*G06F 40/253*  (2020.01)
*G06F 40/30*   (2020.01)

(52) U.S. Cl.
CPC ............ *G10L 15/04* (2013.01); *G06F 40/253* (2020.01); *G06F 40/30* (2020.01)

(58) Field of Classification Search
CPC ......... G10L 15/04; G06F 40/253; G06F 40/30
See application file for complete search history.

(56) References Cited

U.S. PATENT DOCUMENTS

| | | | | |
|---|---|---|---|---|
| 10,134,425 B1 * | 11/2018 | Johnson, Jr. | ............ | G10L 15/05 |
| 10,304,458 B1 * | 5/2019 | Woo | ........................ | G10L 17/02 |
| 11,120,490 B1 * | 9/2021 | Pham | ................. | G06Q 30/0625 |
| 2003/0055655 A1 * | 3/2003 | Suominen | ............... | G10L 15/22 |
| | | | | 704/E15.04 |
| 2003/0234803 A1 * | 12/2003 | Toyama | .............. | G06F 16/7847 |
| 2003/0234805 A1 * | 12/2003 | Toyama | .............. | H04N 21/8456 |
| 2016/0027471 A1 * | 1/2016 | Gottlieb | ............... | G11B 27/031 |
| | | | | 386/241 |

(Continued)

FOREIGN PATENT DOCUMENTS

| | | | | |
|---|---|---|---|---|
| CN | 111353065 A | * | 6/2020 | |
| DE | 102018211758 A1 | * | 11/2019 | ............. G06Q 10/04 |
| GB | 2571340 A | * | 8/2019 | ............... G10H 1/00 |

OTHER PUBLICATIONS

Liutkus, Antoine, et al., "Kernel Additive Models for Source Separation", IEEE Transactions on Signal Processing, vol. 62, Issue 16, Jun. 22, 2014, 14 pages.

(Continued)

*Primary Examiner* — Pierre Louis Desir
*Assistant Examiner* — Keisha Y. Castillo-Torres
(74) *Attorney, Agent, or Firm* — Kilpatrick Townsend & Stockton LLP

(57) ABSTRACT

A media edit point selection process can include a media editing software application programmatically converting speech to text and storing a timestamp-to-text map. The map correlates text corresponding to speech extracted from an audio track for the media clip to timestamps for the media clip. The timestamps correspond to words and some gaps in the speech from the audio track. The probability of identified gaps corresponding to a grammatical pause by the speaker is determined using the timestamp-to-text map and a semantic model. Potential edit points corresponding to grammatical pauses in the speech are stored for display or for additional use by the media editing software application. Text can optionally be displayed to a user during media editing.

16 Claims, 7 Drawing Sheets

(56) References Cited

U.S. PATENT DOCUMENTS

| | | | | |
|---|---|---|---|---|
| 2017/0213569 | A1* | 7/2017 | Jang | G06F 3/0488 |
| 2020/0019594 | A1* | 1/2020 | Kerr | G06F 40/106 |
| 2021/0158812 | A1* | 5/2021 | Wooters | G10L 15/05 |
| 2021/0389868 | A1* | 12/2021 | Crowder | A63F 13/63 |

OTHER PUBLICATIONS

Srinidhi, Sunny, "Understanding Word N-grams and N-gram Probability in Natural Language Processing" (the Fasttext Series), Towards Data Science, Nov. 27, 2019, 5 pages.

Kurimo, Mikko., "Neural Network Language Model (NNLM)," My Courses: AALTO University, 2018, 61 pages.

\* cited by examiner

AUDIO-BASED MEDIA EDIT POINT SELECTION

TECHNICAL FIELD

This disclosure relates generally to the field of digital media processing. More specifically, this disclosure relates to processing techniques for identifying edit points in media based on information in the accompanying audio track, for example, during editing using a video editing software application.

BACKGROUND

Although certain existing solutions assist videographers in using audio information to select edit points of a media clip, the process can be tedious. Consider a user trying to crop a media clip that includes human speech. It is typically desirable to trim or crop such clips so that breaks between video segments occur at natural pauses in the speech contained in the audio track. A user may also wish to select certain audio to be included based on meaning or content. Otherwise, the resulting, edited presentation may include accompanying audio, which is abruptly clipped, reducing the overall appeal of the presentation. A typical video editing application provides mechanisms to shuttle through a clip at various speeds so that the user can manually identify a potential edit point. The user may then engage in trial-and-error, by editing, playing back an edited segment, listening to the result, and repeating as necessary.

For example, consider a user trying to crop a video clip of a speech given during a party. If the speaker is not very good at public speaking, the user may want to trim some ineffectual moments out of the presentation. While trimming the media clips, only frames in a video timeline and an audio waveform graph are available to the user via a media editing application. In such a scenario, it can be very difficult for the user to cut or trim a media clip to a specific textual point, since the user has no easy way to recognize natural grammatical pauses in speech. The audio waveform graph is not specific to speech and includes other sounds. Further, even pauses in speech may be caused by hesitation, interruption by other sounds, or misplaced dramatic intent. The only option, in this example, is to trim or crop the media using observation and assumptions and play the resulting segment. If the resulting segment is not satisfactory, the user repeats this procedure, taking a significant amount of time. The procedure can be even more tedious and time consuming on a mobile device with a small touchscreen.

SUMMARY

Certain embodiments for identifying an edit point or suggested edit point within a media clip involve a media editing software application programmatically producing and storing a timestamp-to-text map. The map correlates text corresponding to speech extracted from an audio track for the media clip to timestamps for the media clip. The timestamps correspond to words and some gaps in the speech from the audio track. The probability of identified gaps corresponding to a grammatical pause by the speaker is determined using the timestamp-to-text map and a semantic model. At least one potential edit point for the media clip that corresponds to the grammatical pause in the speech is stored for display or for additional use by the media editing software application.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
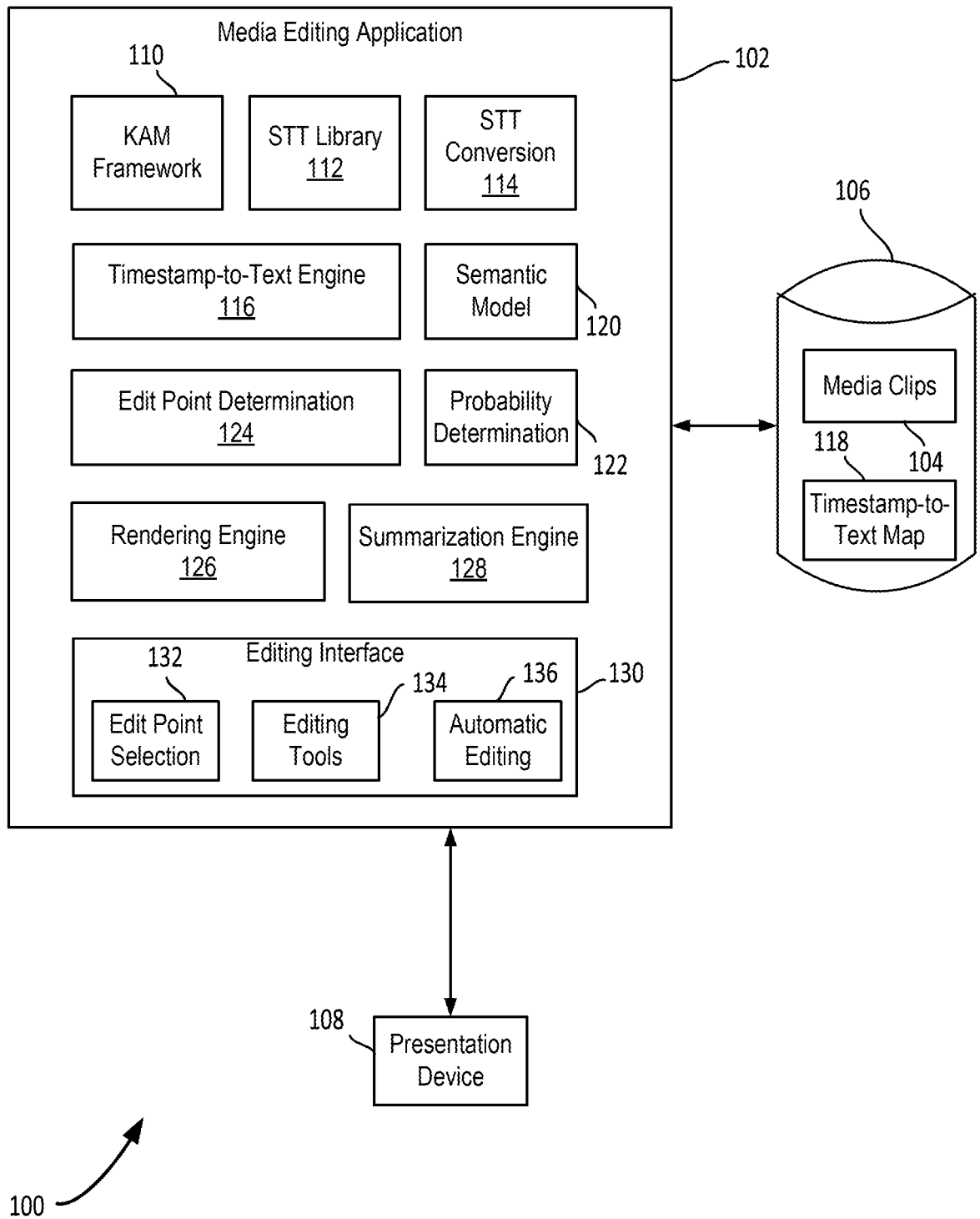
FIG. 1 is a diagram showing an example of a computing environment for audio-based media edit point selection, according to certain embodiments.

As described above, existing media editing applications provide mechanisms to shuttle through a media clip at various speeds so that the user can manually identify a potential edit point based on either audio or video tracks. The user may then engage in trial-and-error, by editing, playing back an edited segment, and listening to the result, repeating as necessary. In some applications, only frames in a video timeline are available. In other applications, frames of video and an audio waveform graph are available in the user interface. In either case, it can be very difficult for the user to crop or trim media to a specific textual point without significant trial and error. Embodiments described herein address these issues by providing automated detection of grammatical pauses in speech contained within the audio track of a media clip. The automated detection of grammatical pauses is included in a digital media editing application, for example, as part of a feature to locate grammatical pauses and display an indication of their positions as potential edit points.

The following non-limiting example is provided to introduce certain embodiments. In this example, a media editing application identifies gaps in speech represented in an audio track of a media clip. The media editing application first isolates speech in the audio track from other sounds. The media editing application then converts at least a portion of the speech to text. The media editing application also produces a timestamp-to-text map by mapping the text to timestamps of the media clip. The media editing application then determines, using the timestamp-to-text map and a semantic model, a comparative probability of a gap corresponding to a grammatical pause in the speech represented in the audio track. As one example of a semantic model, a deep-learning neural network serves as a semantic model when trained to output, for a given word, a probability that the given word is followed by another word.

An example of a grammatical pause is the end of a sentence. Other examples might include a pause where a semicolon or comma might occur if the text were written. In some examples, the media editing application uses the semantic model to exclude from display any non-grammatical pause, such as one that represents mere hesitation by a speaker. The media editing application identifies and stores a potential edit point that corresponds to the likely grammatical pause. The stored, potential edit point can be represented with or without a displayed timestamp. The media editing application updates a user interface to display one or more of these potential edit points based on their timestamps.

Continuing with this example, the media editing application may display potential edit points interactively. In such a case, the media editing application responds to a user's selection of a potential edit point either by automatically taking some default editing action, such as splitting or trimming the media clip, or by responding to a selection of an editing control in a user interface to take action at the selected potential edit point. To enable the user to make a more informed decision as to which of a number of displayed potential edit points to select, the media editing application optionally displays a portion of the text corresponding to a potential edit point by using the timestamp-to-text map. An application can optionally be designed to programmatically select an edit point and carry out an editing action. Such a feature may be useful in a so-called "easy" mode of operation of the media editing application, or may be included in a media processing application that can automatically create a "memory" or a "highlight reel" from a group of media clips in order to make the resulting presentation more salient or pleasing.

Certain embodiments provide improvements over existing techniques for editing media clips in a way that accommodates the natural flow of speech recorded in an audio track of a media clip, even when the audio track contains other sounds. For instance, a processor executing a media editing application determines and stores potential edit points based on grammatical pauses in the speech as distinct from other sounds by creating a timestamp-to-text map and using the map together with a stored semantic model. The preselection of potential edit points enables faster editing by a user, or is used by the processor to automatically make edits and produce a finished media presentation, providing a more suitable solution than those currently available for automating tasks previously performed by humans.

Various embodiments involve different techniques for finding, storing, and using potential edit points that correspond to grammatical pauses in speech represented in an audio track. Speech in an audio track that occurs with other sounds is isolated by the media editing application, for example, using kernel-additive modeling of the audio track of the media clip to identify audio sources and isolate the speech from among the audio sources. A timestamp-to-text map based on the speech is produced, for example, by determining individual words as well as some gaps between words in the speech. The semantic model used by the application to identify grammatical pauses as distinct from other pauses can include a deep-learning neural network that has been trained to output word occurrence probabilities in relation to prior words. Other semantic models can be used, for example, semantic models based on Markov modeling.

The term "edit point" as used herein refers to a place in time within a media clip where an editing action takes place. Examples of editing actions include a split, trim, cut, crop, or any other similar type of alteration. An editing action can also include the insertion of a title, the insertion of a transition, an alteration of visual characteristics, or any other similar action commonly performed during media editing. The term "potential edit point" refers to a point in a media clip that has been marked or selected as an edit point prior to performing an editing action, whether or not the actual editing action takes place. A potential edit point is selected programmatically or manually, or by a combination of the two.

Once a potential edit point is identified and stored by a media editing application, it is interactively displayed in association with the media clip along with at least a portion of the text corresponding to the potential edit point. Such a display is considered interactive, as an example, because a user can select a displayed potential edit point and make an edit or perform other actions, such as displaying a context menu or displaying additional information. Optionally, the application displays the potential edit point along with portions of text from two or more speakers and varies a visual attribute in accordance with the text attributable to each speaker. In alternative embodiments, an application can programmatically carry out edits based on stored edit points rather than or in addition to relying on user input to complete edits. Such programmatic editing can be useful for automatically assembling a presentation of media clips.

FIG. 1 is a diagram showing an example of a computing environment for audio-based media edit point selection, according to certain embodiments. The computing environment 100 includes one or more processing devices that execute a media editing application 102, one or more media clips 104 stored in a portion 106 of a memory device, and a presentation device 108 that is controlled based on the media editing application 102. In this example, the media editing application 102 includes a kernel-additive modeling (KAM) framework 110, speech-to-text (STT) library 112, and STT conversion module 114, which makes use of STT library 112. The KAM framework identifies audio sources represented in the audio track of a media clip to identify human speech and the STT conversion model converts the speech to text. The media editing application 102 also includes timestamp-to-text engine 116, which produces and stores the timestamp-to-text map 118. The timestamp-to-text map 118 includes timestamps correlated to words in the text produced from the speech in the audio track. The map also includes timestamps indicating gaps in the speech.

Media editing application 102 can be executed by a single processor and reside in a single computing device with the single processor or multiple processors, such as a mobile device or other personal computing device. Alternatively, multiple processors may execute the software components of media editing application 102, and the processors as well as the various software components described with respect to FIG. 1 can reside across computing devices in a network so that the media editing features described herein can be provided as a service to a client device.

The media editing application 102 further includes a semantic model 120 and a probability determination module 122. These modules are used with the timestamp-to-text map to identify likely grammatical pauses based on both time and semantics as described herein with respect to FIG. 3. The media editing application 102 includes edit point determination module 124, rendering engine 126, and summarization engine 128. The media editing application 102 also generates a media editing interface 130. In some embodiments, the media editing application 102 uses inputs related to edit point selection 132, and editing tools 134 received via the media editing interface 130 to control one or more operations of the media editing application 102. In some embodiments, the media editing application 102 edits media clips automatically when automatic editing 136 is selected in the media editing interface 130.

The media editing application 102 provides the editing interface 130 for display at a presentation device 108, which can be a local presentation device or a computing device that is remotely accessible over a data network. The rendering engine 126 includes one or more software modules that render content for display in an editing interface 130. This content can include a current frame, a playing video clip, or video presentation displayed in a video window as discussed with respect to FIGS. 4-6. The content can also include thumbnail images, edit points, and editing controls, also as described with respect to FIGS. 4-6. Summarization engine 128 tracks the status of the various interface elements and user selections and determines how to adjust or render various displayed elements. For example, the summarization engine determines the scale and interval of timestamps to be displayed, and the arrangement and location of points on the timeline, including potential edit points. The summarization engine also determines which frames should be used as thumbnail images to be displayed as part of the timeline.

Figure 2:
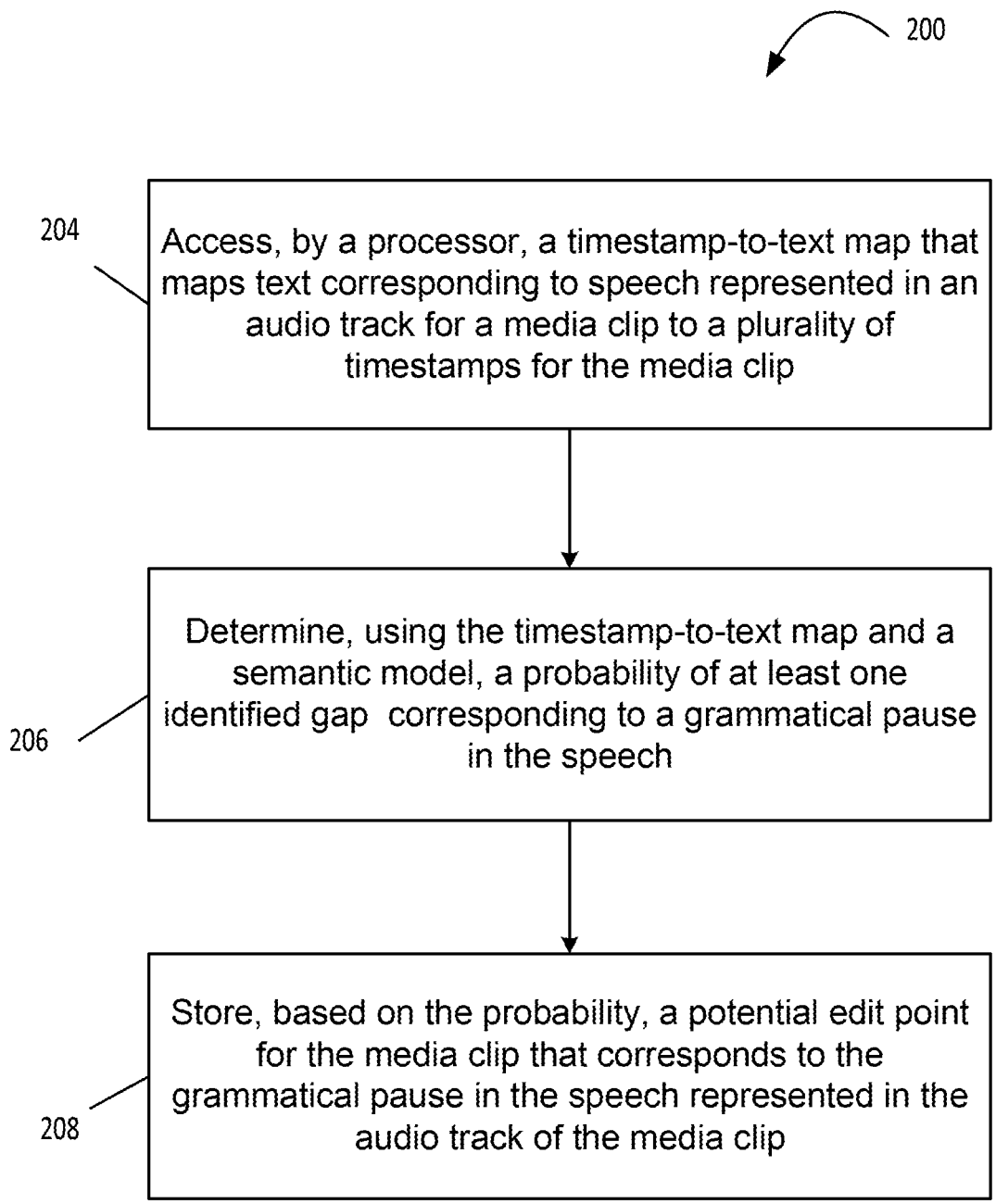
FIG. 2 is a flowchart of an example of a process for audio-based media edit point selection, according to some embodiments.

FIG. 2 presents a flowchart depicting an example of a process 200 for identifying edit points in a media clip based on information in the accompanying audio track with a computing device carrying out the process by executing suitable program code. As used herein, the term "speech" refers to words uttered by a person and recorded in a media clip whether uttered in conversation, in a formal presentation, in song, etc. As used herein, the term "text" refers to printed, stored, or displayed letters or characters that represent words, stored indications of at least some gaps between the words as previously rendered in speech, or both. As used herein, a "grammatical pause" is a pause in speech that occurs due to the occurrence of a grammatical construct in time, as would be indicated in text with other punctuation, characters or other textual conventions in any language. Examples of a grammatical pause include a pause at the end of a sentence, a rhetorical pause, or a pause at the end of a phrase.

At block 204 of FIG. 2, a processor in a computing device accesses the timestamp-to-text map 118. The map's information includes textual words corresponding to spoken words represented in the audio track mapped to timestamps as well as some gaps in the speech that occur between words mapped to timestamps. The timestamp-to-text map is produced as described below with reference to blocks 302-306 of FIG. 3. At block 206, the map 118 and semantic model 120 are used by the processor to determine a probability of at least one identified gap corresponding to a grammatical pause in the speech. This probability is determined as described below with respect to block 308 of FIG. 3. At block 208, the processor stores, based on the probability, potential edit points for the media clip that correspond to one or more grammatical pauses in the speech represented in the audio track. The edit point locations are determined as described below with respect to block 310 of FIG. 3.

Figure 3:
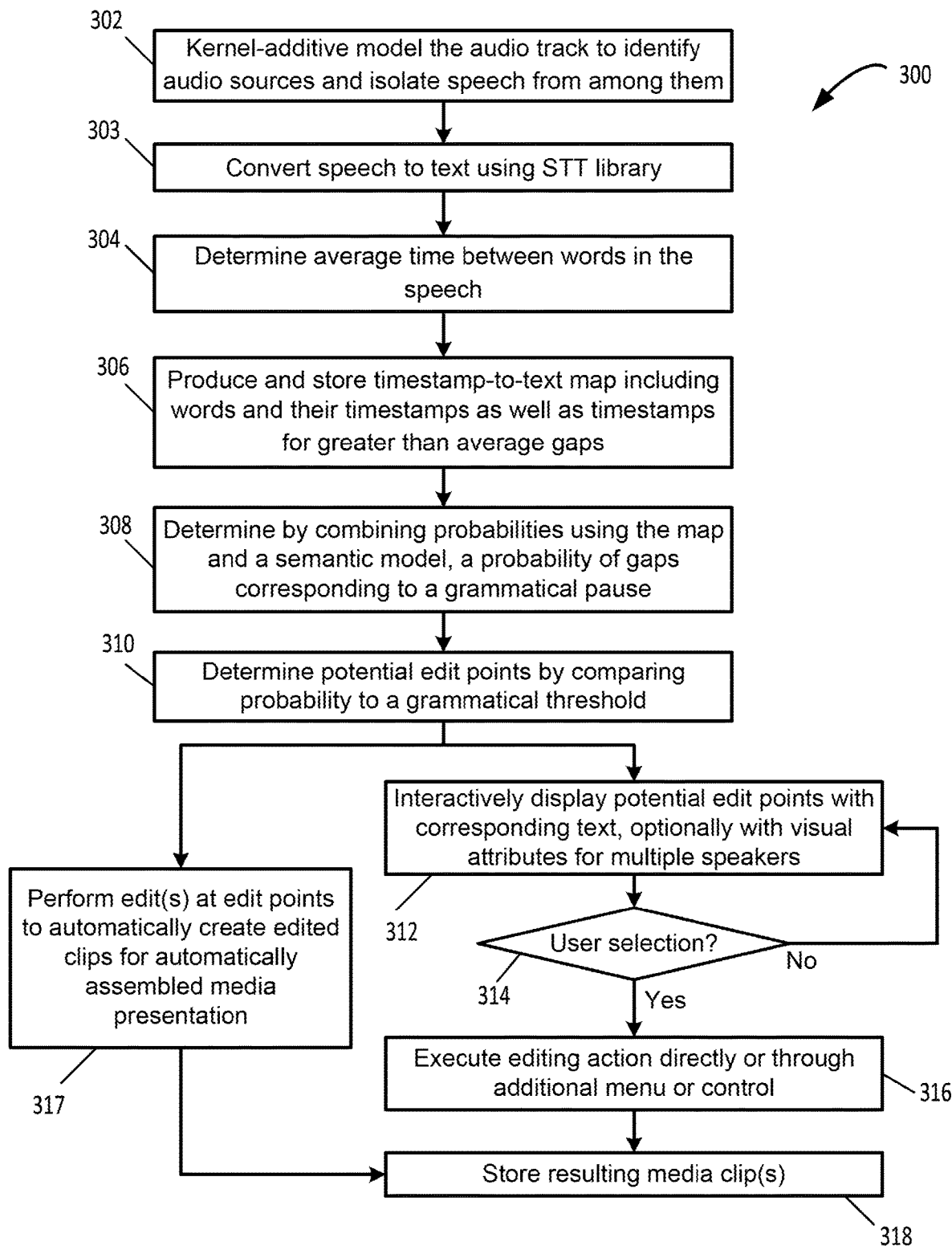
FIG. 3 is a flowchart of another example of a process for audio-based media edit point selection, according to certain embodiments.

FIG. 3 is a flowchart depicting an example of a process 300 for identifying edit points in a media clip based on information in the accompanying audio track with a computing device carrying out the process by executing suitable program code. In this example, a processor executing media editing application 102 uses kernel-additive modeling at block 302 to model the audio track to identify audio sources represented in the track and determine which audio source is human speech. The terms "audio" and "audio track" as used herein refer to a sound portion of a media clip, video segment, or media presentation. The audio track may contain speech, music, ambient noise, sound effects, etc.

Kernel additive modeling is a framework for source separation. Initially, areas of background noise only and areas including actual speech are marked in memory. Only an approximation in terms of timestamps associated with speech and timestamps associated with areas of background noise is initially needed. The framework then uses local regression to separate multidimensional, nonnegative, or non-regularly sampled signals, or a combination of these. The process is carried out under an assumption that the level of a source at some location can be estimated using its level values at other locations nearby, where nearness is defined through a source-specific proximity kernel. The source-specific proximity kernel accounts for features like periodicity, continuity, smoothness, stability over time or frequency, self-similarity, etc. In many cases, such local dynamics provide a better assessment than a global model such as a model based on tensor factorization. In a media clip with more than one person talking, use of multichannel audio source separation also identifies the individual speech of multiple persons and enable the speech of each to be converted to text.

At block 303 of process 300, the processor executes STT conversion module 114 to convert the speech to text using STT library 112 to identify spoken words and convert them to textual words. An STT library includes the audio characteristics of all phonemes that make up all words in the language of interest as well as links or tables that indicate which words are made from specific patterns of phonemes. At block 304, the processor determines an average time between words in the speech represented in the audio track of the media clip of interest. At block 306, the processor produces and stores the timestamp-to-text map 118 by executing timestamp-to-text engine 116. The map includes every textual word corresponding to the spoken words and the timestamps at which they begin. The media editing application 102 uses the map to render text when editing. At block 308, using the map, and semantic model 120, the processor determines a probability of each gap corresponding to a grammatical pause in the speech. In some embodiments, the semantic model includes a deep-learning neural network that has been trained with millions of sentences. In other embodiments, a different type of semantic model can be used, for example, a semantic model based on Markov chains. Using both the map and the semantic model provides for an accurate and computationally efficient two-part process. Markov models are state based. In order to use a model to predict speech, a Markov model is designed to treat each word as a state and to predict the next state (word) for each word. Examples of a deep-learning neural network model that can be used as a semantic model in process 300 include an N-gram language model, a neural network language model (NNLM), or a recurrent neural network language model (RNNLM). Regardless of the type of model chosen, the semantic model outputs a probability function that corresponds to the words being spoken. In one example, the probability (P) assigned to each pair of spoken words, and thus to the gap between them, is the probability of the first spoken word in the pair being followed by the spoken word after it in a sentence. The inverse of this probability is the probability that a sentence or phrase ended between those two words.

In the first part of the two-part process, the processor executes probability determination module 122 to determine the timestamp for each gap that is characterized by a high probability of corresponding to a sentence ending or similar grammatical pause based on timing. The processor adaptively analyzes the timestamp-to-text map and finds all gaps with a length in time that exceeds the average gap between words for the particular speaker. Statistically, if the values of these gaps are treated as a function, there is typically a relatively consistent, relatively high value that occurs relatively regularly. These high, time-based probability gaps are stored in a list indexed by their timestamps. In the second part of the process, the semantic model 120 is applied by the probability determination module 122 to refine the estimates. The semantic model outputs the probability (P) of each word occurring at the beginning of a gap in the stored list being followed by the next word in a sentence. The lower this probability, the higher the word-based probability (1-P) that a gap represents a true grammatical pause.

With some speech patterns, the time value function determined above has no clear peaks. There are a number of ways a media editing application can handle this situation. Examples include flagging the problem to a user with a statement that grammatical edit point recommendations are not available with the clip or relying on the semantic model alone. In another example, the indexed list can be alternatively created from gaps with a length equal to 1.5 times the average gap between words. It is also possible to circumvent the issue entirely by just using the longer time threshold rather than the greater-than-average value with statistical peaks. Relying on a threshold alone may produce results that are not as accurate as otherwise possible with some speakers.

Still referring to FIG. 3, at block 310, the processor executes the edit point determination module 124 to determine potential edit points using both the time-based probability and the word-based probability. A comparative probability for a gap from the timestamp-to-text map being a grammatical pause can be treated as a combination of the time-based probability and the word-based probability since time-based probability is used to limit the data input to the semantic model. A comparative probability for a gap in the map is zero if the gap was not included in the indexed list that was based on time and was thus not used to provide the inputs to the semantic model. Otherwise, the word-based probability for the gap is the comparative probability for the gap. The comparative probability for each gap is compared to an overall probability threshold, referred to herein as a grammatical threshold. If the comparative probability is higher than the grammatical threshold (GT), then the pause at that timestamp is presumed to be a grammatical pause and is chosen as a potential edit point. As an example, GT is set to 0.6. In some embodiments, GT is stored or hard-coded into media editing application 102. In some embodiments, GT is adjustable through the editing interface 130. Adjusting the threshold value causes media editing application 102 to select and display more or fewer potential edit points.

In some embodiments, potential edit points are displayed and acted on based on user input. In such an embodiment, at block 312 of process 300, the processor displays the potential edit points interactively at timestamps determined by summarization engine 128 in a visual display created by rendering engine 126. During manual editing, the markers can be used for performing video editing without the user having to listen to speech content from the audio track of the media clip. For example, the media editing application 102 can be configured to display the edit points on presentation device 108 as markers in or on the timeline. Markers are optionally displayed with a portion of the corresponding text. As one example, a marker for a current edit point can show the text before and after the corresponding timestamp. Optionally, if there are multiple speakers represented in the audio track, multiple lines of text are displayed highlighted with a varied visual attribute.

At block 314 of process 300, edit point selection module 132 detects any user selection of a potential edit point, continuing to display potential edit points at block 312 until and unless the user selection is received. At block 316, a user selection of an edit point causes the processor to execute an editing action directly or through an additional action, for example, receiving a second user selection of an editing action through an additional button or control that is part of the editing tools module 134. The media editing application 102 can also be designed to present a context menu of editing choices. As an alternative to manual editing assisted by the display of potential edit points, a user can select the automatic editing module 136 through the editing interface 130. Following such a selection, at block 317, media editing application 102 automatically performs edits at edit points to create edited clips based on the stored edit points. These edited clips can then be assembled into a media presentation. Media clips resulting from any edits are stored at block 318. In still another alternative embodiment, the media editing application may not provide for any user control of editing. Instead, the media editing application may edit media clips in response to potential edit points being determined and stored and assemble a presentation as soon as a selection of media clips is identified.

Figure 4:
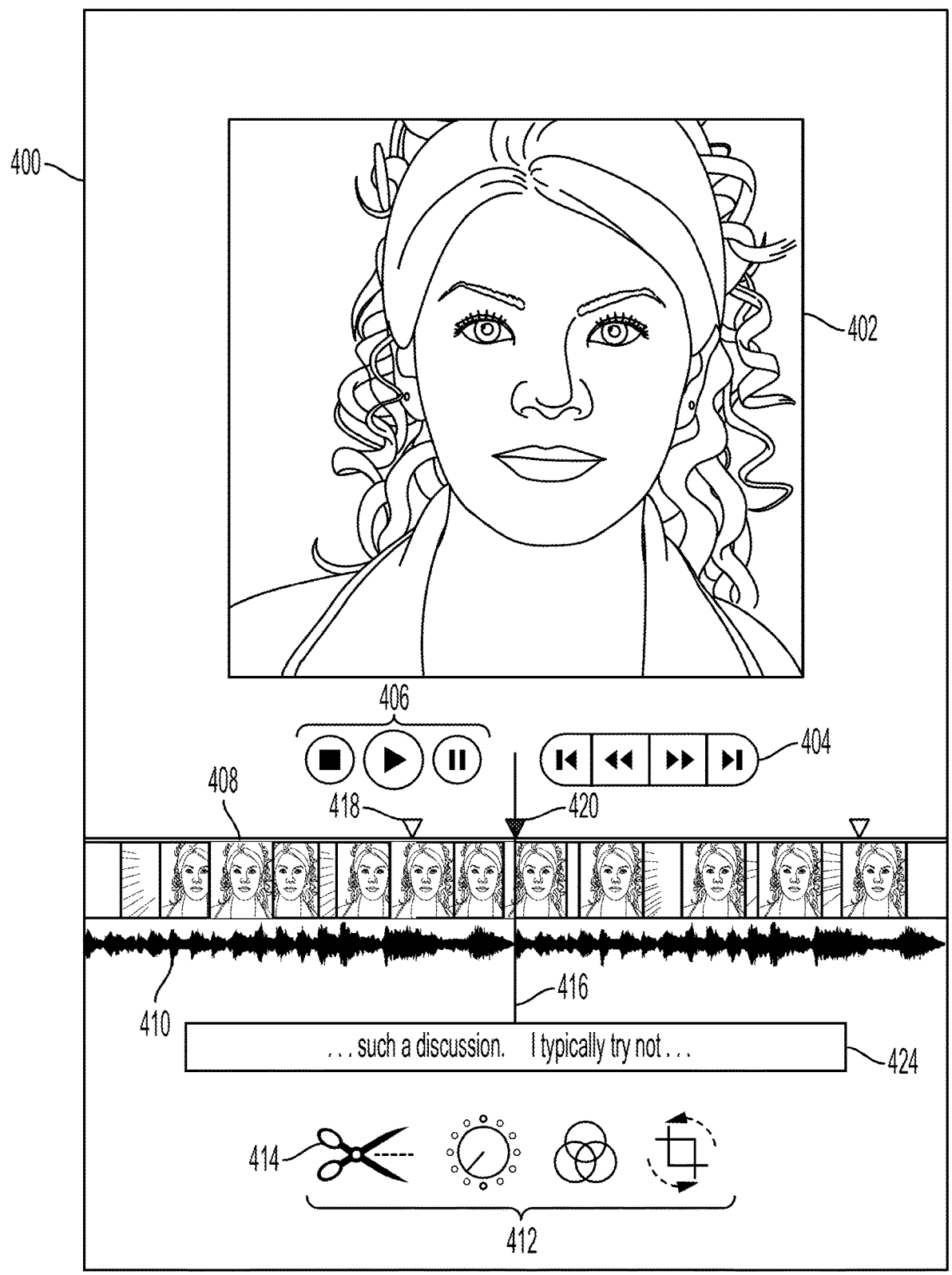
FIG. 4 is a schematic illustration of a user interface that can be used for interactively identifying audio-based video edit points using certain embodiments.

FIG. 4 is a schematic illustration of a user interface 400 that is used for identifying and interactively displaying audio-based potential edit points using certain embodiments. More specifically, the computing device that is implementing user interface 400 is a smartphone or tablet computer. However, all of the controls and operation described can be implemented on a workstation media editing application, though an interface displayed by such a device would likely have a different aspect ratio. User interface 400 is displaying the video portion of a media clip in video window 402. User interface 400 includes jog/shuttle controls 404 and play/pause/stop controls 406, which can be used to play the video in video window 402. The accompanying audio can be played by the user at the same time through a speaker or headphones. Thumbnail images of extracted video frames are shown in video timeline 408. An audio waveform graph 410 is shown under the video timeline. The audio waveform graph corresponds to the video frames. User interface 400 includes editing controls 412, which may be selected by the user to perform editing actions. For example, editing control 414 crops or cuts the currently displayed media clip, and therefore can be referred to as a crop button.

User interface 400 includes two types of timeline markers. Current position marker 416 indicates the position in the timeline of the video frame currently displayed in video window 402. Potential edit point markers 418 indicate points in the timeline that the media editing application has selected as potential edit points using the process just discussed with respect to FIG. 3. Potential edit point marker 420 similarly indicates a potential edit point in the timeline, but this point is at the current position in the timeline and so is highlighted. The user can quickly perform an edit action at this point. For example, the user can perform the edit action of cropping the current clip at this point by clicking the crop button 414. In this embodiment, the user can move the timeline and video frame to one of the other potential edit point markers 418 by using the advance-to-point buttons of the jog/shuttle controls 404 and instead perform the crop or another edit action at one of those points in the timeline. The user assumes that editing at a point in the timeline corresponding to any of these markers produces edited clips without an audio disruption. This assurance results from the potential edit points being automatically set by the editing application at a grammatical pause in the speech contained in the audio track of the media clip.

Still referring to FIG. 4, user interface 400 displays text derived from the speech in the audio track of the current media clip. This text is displayed in text box 424 and corresponds to speech uttered around the current position in time. In this view, the current position marker is at the end of a sentence. In addition to allowing the user to confirm that the currently selected edit point is at a grammatical pause, the text display allows the user to observe and verify the speech content without having to play the clip and listen to the audio. The user could even accurately select from multiple potential edit points without playing the media clip, or when playing the media clip with the sound on the computing device muted.

Figure 5:
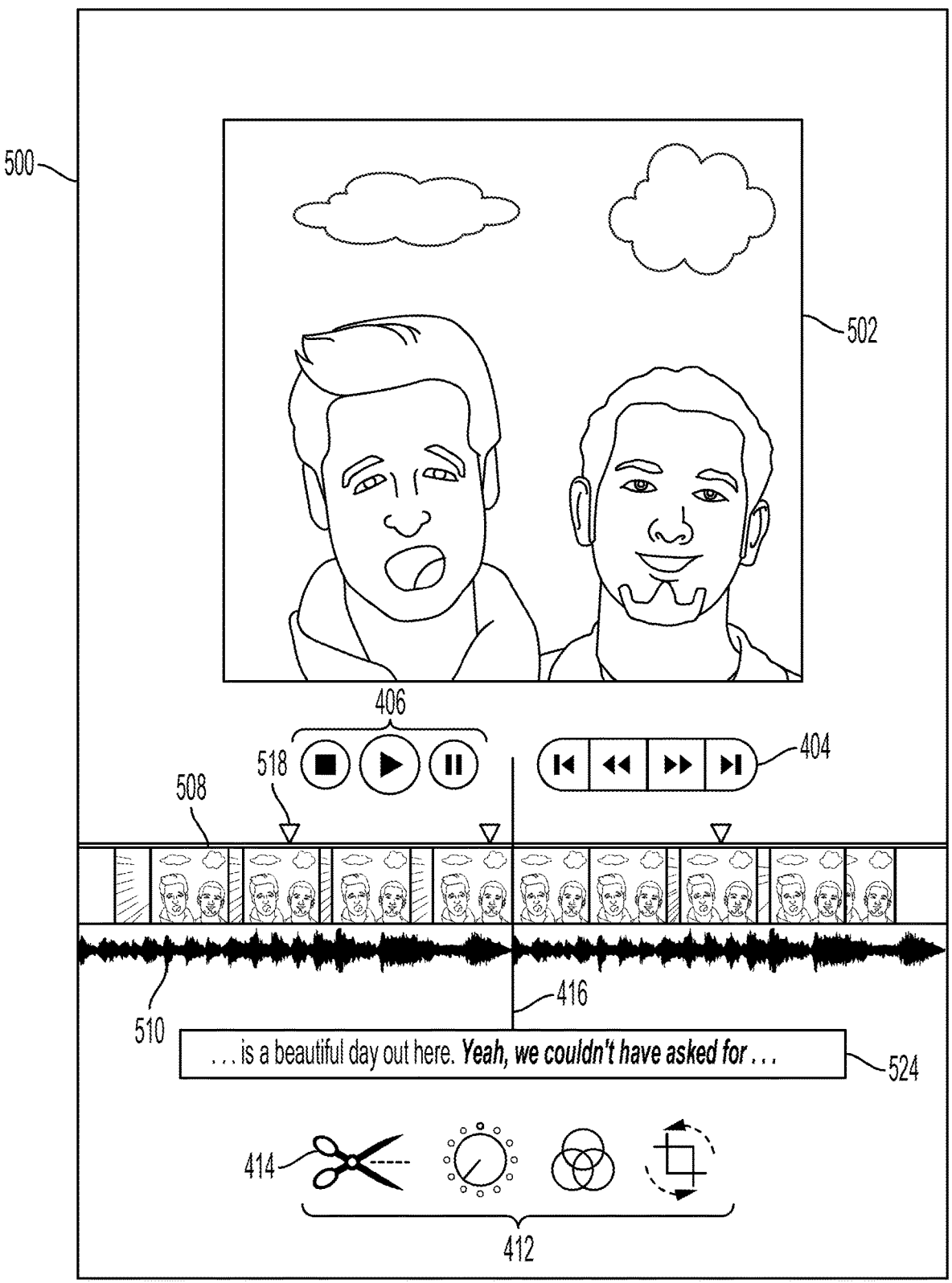
FIG. 5 is a schematic illustration of another user interface that can be used for interactively identifying audio-based video edit points using certain embodiments.

FIG. 5 is a schematic illustration of a user interface 500 that is used for identifying and interactively displaying audio-based potential edit points using certain embodiments. User interface 500 is displaying the video portion of a media clip in video window 502. However, the particular frame of the media clip currently being displayed includes two people having a conversation. The video controls for user interface 500 as well as the current position marker are all are like the ones shown in FIG. 4 and thus have like reference numbers. Thumbnail images of extracted video frames of a video of the two people talking are shown in video timeline 508. The audio waveform graph 510 is under the video timeline. This audio waveform graph includes sounds from a two-person conversation.

User interface 500 includes potential edit point markers 518 to indicate points in the timeline that the media editing application has selected as potential edit points using the process discussed with respect to FIG. 3. However, the editing application with user interface 500 includes the capability to convert speech from multiple people into text, delineate the text from each person using a visual attribute, and determine potential edit points by taking the speech from multiple persons into account. Potential edit point markers 518 indicate places where there are overlapping grammatical pauses from the two speakers. The user can move the timeline and video frame to one of the potential edit point markers 518 by using the advance-to-point buttons of the jog/shuttle controls 404 and perform a crop or another edit action. The user assumes that editing at a point in the timeline corresponding to any of these markers produces edited clips without an audio disruption.

Still referring to FIG. 5, user interface 500 displays text derived from the speech in the audio track of the current media clip. This text is displayed in text box 524. The text from each person is indicated in this view by a visual attribute that is rendered differently for each speaker. In this case, a different font is used for the displayed text corresponding to each speaker. In other examples of a user interface, alternative visual attributes can be used, such as color, shadow, intensity, background color, etc.

Figure 6:
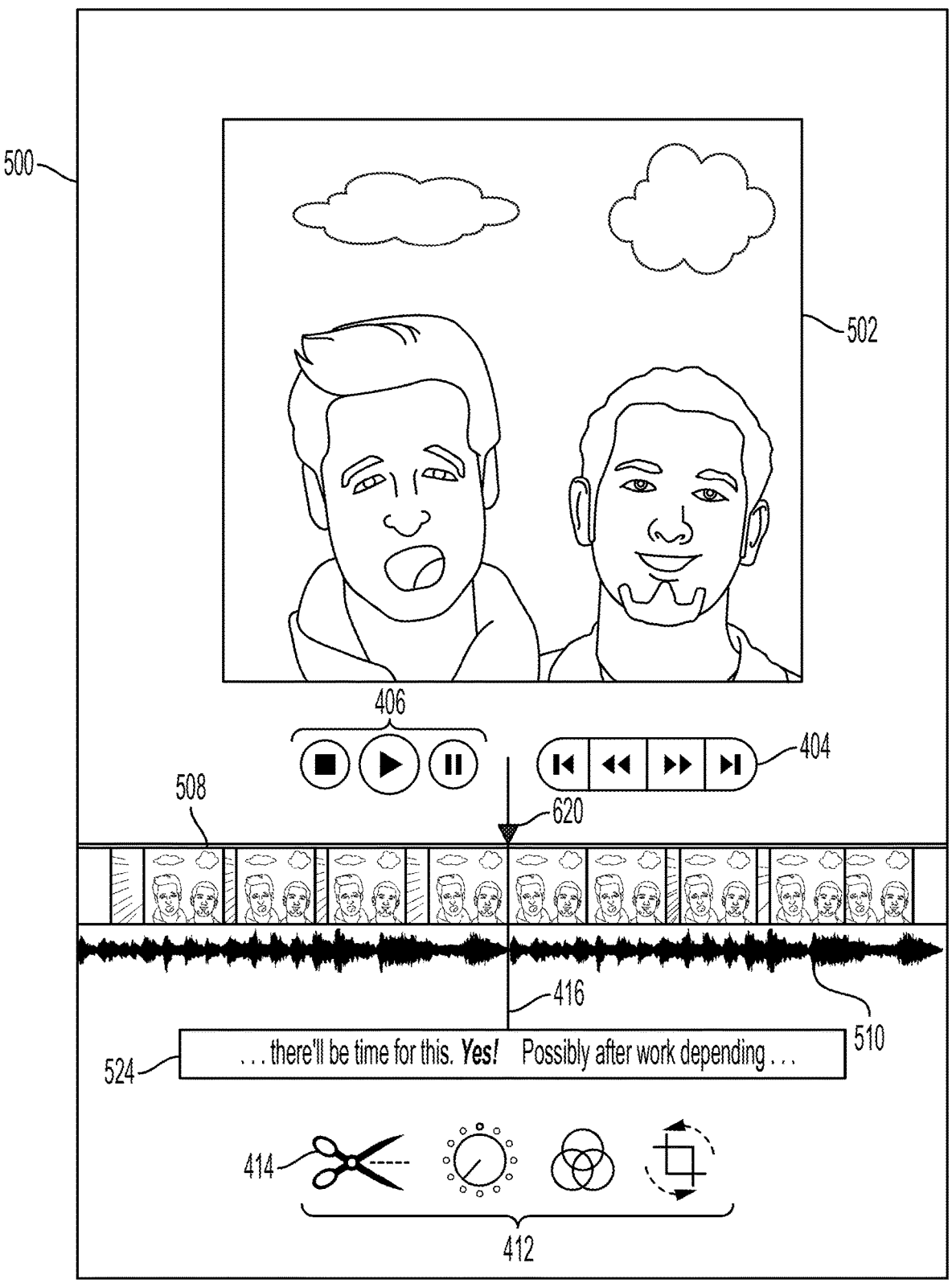
FIG. 6 is a schematic illustration of an additional user interface that can be used for interactively identifying audio-based video edit points using certain embodiments.

FIG. 6 is another schematic illustration of the user interface 500. In FIG. 6, the user has navigated to one of the potential edit point markers, potential edit point marker 620, which has become highlighted. Potential edit point marker 620 is positioned at current position marker 416, since the user has used the advance-to-point buttons of the jog/shuttle controls 404 to move the corresponding point in the timeline to the current position marker. User interface 500 continues to display text derived from the speech in the audio track of the current media clip. This text is displayed in text box 524 and is differentiated by visual attribute. The user can readily confirm that the currently selected edit point is at a grammatical pause for both of the people in the video, and as before, the user can observe and verify the speech content without having to play the clip and listen to the audio.

As additional examples of an operating environment for embodiments disclosed herein, various commercially available software applications provide automated media editing. As one example, some applications analyze a user's gallery of media and automatically create presentations from videos and photos present in the gallery. These presentations, sometimes called "memories," "highlight reels," or "collages," provide a user with a video presentation that can be watched and shared in order to appreciate the different moments documented in the original images without having to view clips in their entirety. As another example, some video editing applications provide a simple mode, or automatic mode, that creates an edited video presentation, which the user can then view and refine before outputting or storing a polished, final presentation. As another example, some software applications allow users to watch a preview or highlight reel of a relatively long video presentation by automatically creating a presentation of small portions of the longer video strung together. Applications such as those described above typically make edits based on time or based on video track content. Embodiments described herein can be added to such applications to eliminate abrupt audio changes and create a more pleasing highlight presentation with better saliency.

Figure 7:
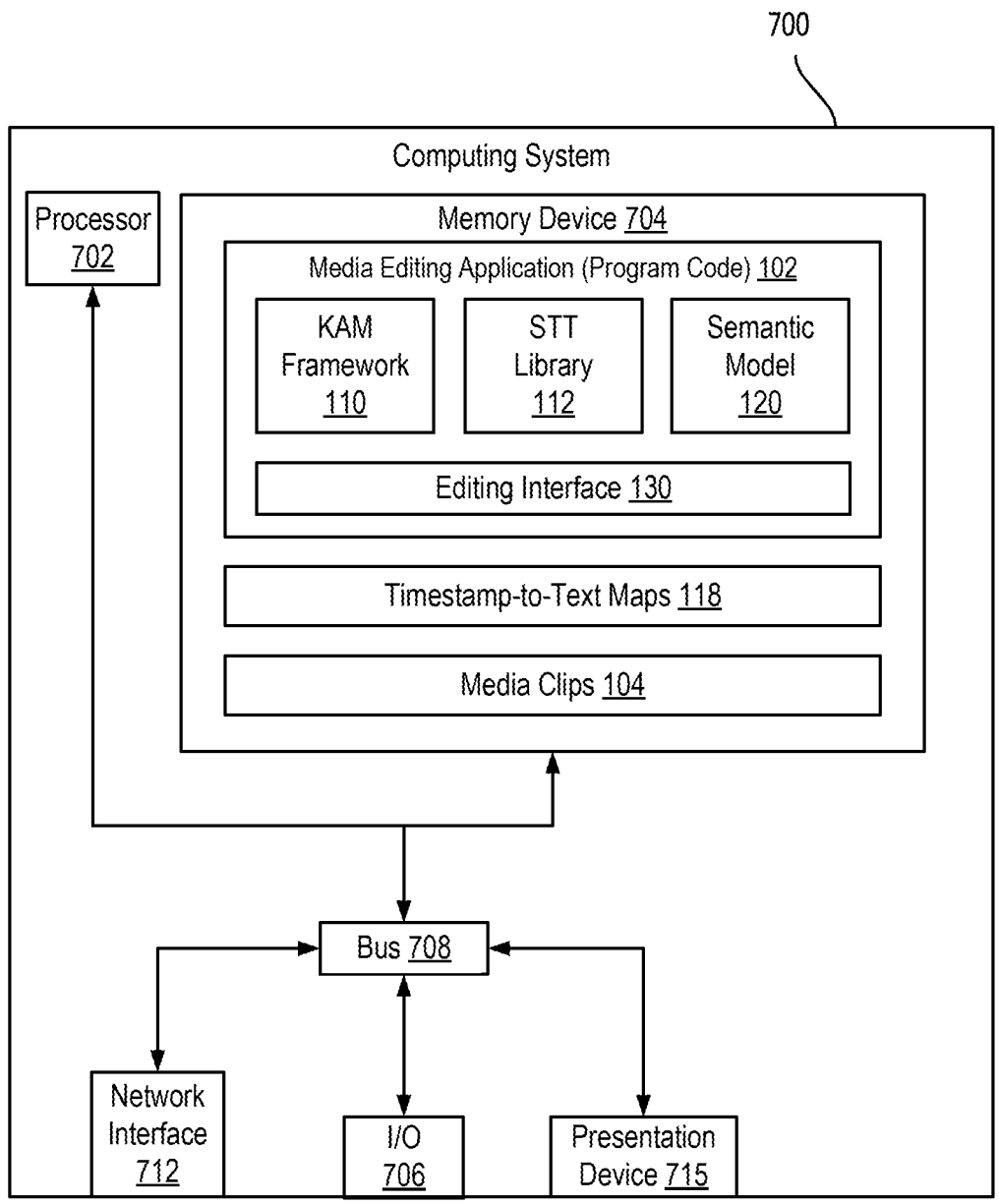
FIG. 7 is a diagram of an example of a computing system that can implement the computing environment of FIG. 1, according to certain embodiments.

FIG. 7 depicts a computing system 700 that executes the media editing application 102 with the capability of identifying audio-based media edit points according to embodiments described herein. System 700 includes a processor 702 communicatively coupled to one or more memory devices 704. The processor 702 executes computer-executable program code stored in the memory device 704. Examples of the processor 702 include a microprocessor, an application-specific integrated circuit ("ASIC"), a field-programmable gate array ("FPGA"), or any other suitable processing device. The processor 702 can include any number of processing devices, including a single processing device. The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Still referring to FIG. 7, the computing system 700 may also include a number of external or internal devices, such as input or output devices. For example, the computing system 700 is shown with one or more input/output ("I/O") interfaces 706. An I/O interface 706 can receive input from input devices or provide output to output devices (not shown). One or more buses 708 are also included in the computing device 700. The bus 708 communicatively couples one or more components of a respective one of the computing system 700. The processor 702 executes program code that configures the computing system 700 to perform one or more of the operations described herein. The program code includes, for example, media editing application 102, or other suitable applications that perform one or more operations described herein. The program code may be resident in the memory device 704 or any suitable computer-readable medium and may be executed by the processor 702 or any other suitable processor. Memory device 704, during operation of the computing system, stores portions of the media editing application such as KAM framework 110, STT library 112, semantic model 120, and editing interface 130 and accesses the portions as needed. Memory device 704 is also used to temporarily store timestamp-to-text maps 118 and media clips 104 for the specific media editing job in progress.

The system 700 of FIG. 7 also includes a network interface device 712. The network interface device 712 includes any device or group of devices suitable for establishing a wired or wireless data connection to one or more data networks. Non-limiting examples of the network interface device 712 include an Ethernet network adapter, a wireless network adapter, and/or the like. The system 700 is able to communicate with one or more other computing devices (e.g., another computing device executing other software, not shown) via a data network (not shown) using the network interface device 712. Network interface device 712 can also be used to communicate with network or cloud storage used as a repository for stored media clips for use with the media editing application 102. Such network or cloud storage can also include updated or archived versions of the media editing application for distribution and installation.

Staying with FIG. 7, in some embodiments, the computing device 700 also includes the presentation device 715 depicted in FIG. 7. A presentation device 715 can include any device or group of devices suitable for providing visual, auditory, or other suitable sensory output. In examples, presentation device 715 displays media clips and video frames. Non-limiting examples of the presentation device 715 include a touchscreen, a monitor, a separate mobile computing device, etc. In some aspects, the presentation device 715 can include a remote client-computing device that communicates with the computing system 700 using one or more data networks.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "determining," and "selecting," or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing device from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured" or "configures" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method comprising:
    accessing, by a processor, a timestamp-to-text map that maps text corresponding to speech represented in an audio track for a video clip to a plurality of timestamps for the video clip;
    determining, by the processor using a deep-learning neural network trained to output word occurrence probabilities, a word-based probability of at least one identified gap in the text corresponding to a grammatical pause in the speech represented in the audio track, the word-based probability based at least on part on word occurrence probabilities in relation to prior word;
    combining, by the processor, the word-based probability and a time-based probability corresponding to the timestamp-to-text map to provide a comparative probability of the at least one identified gap in the text corresponding to the grammatical pause;
    identifying, by the processor based on the comparative probability relative to an input-adjustable grammatical threshold that determines a number of displayed edit points, a potential edit point for the video clip that corresponds to the grammatical pause in the speech represented in the audio track of the video clip;

displaying, by the processor, on a presentation device, a marker indicating the potential edit point in the video clip;

receiving, by the processor, user input directed to an editing action at the marker; and performing, by the processor, the editing action at the marker in the video clip in response to the user input.

2. The method of claim 1 further comprising:

kernel-additive modeling the audio track of the video clip to identify audio sources to isolate the speech from among the audio sources; and producing the timestamp-to-text map based on the speech, wherein the text mapped by timestamp-to-text map includes both words and gaps in the speech.

3. The method of claim 1 further comprising causing the presentation device to display at least a portion of the text corresponding to the potential edit point.

4. The method of claim 3 further comprising causing the presentation device to display a visual attribute corresponding to each of at least two speakers in the video clip.

5. The method of claim 1 wherein the deep-learning neural network trained to output word occurrence probabilities comprises at least one of an N-gram language model, a neural network language model, or a recurrent neural network language model.

6. A non-transitory computer-readable medium storing program code executable by a processor to perform operations, the operations comprising:

accessing a timestamp-to-text map that maps text corresponding to speech represented in an audio track for a video clip to a plurality of timestamps for the video clip;

producing, using the timestamp-to-text map, based on an average-length of gaps between words in the speech, an indexed list containing high, time-based probability gaps in the speech;

determining, based on the indexed list and a word-based probability produced using a deep-learning neural network trained to output word occurrence probabilities, a comparative probability of at least one identified gap from the high, time-based probability gaps corresponding to a grammatical pause in the speech represented in the audio track, the word-based probability based at least on part on word occurrence probabilities in relation to prior word;

identifying, based on the comparative probability relative to an input-adjustable grammatical threshold configured to determine a number of displayed edit points, a potential edit point for the video clip that corresponds to the grammatical pause in the speech represented in the audio track of the video clip;

displaying, on a presentation device, a marker indicating the potential edit point in the video clip;

receiving user input directed to an editing action at the marker; and performing the editing action at the marker in the video clip in response to the user input.

7. The non-transitory computer-readable medium of claim 6 wherein the operations further comprise:

kernel-additive modeling the audio track of the video clip to identify audio sources to isolate the speech from among the audio sources; and producing the timestamp-to-text map based on the speech, wherein the text mapped by timestamp-to-text map includes both words and gaps in the speech.

8. The non-transitory computer-readable medium of claim 6 wherein the operations further comprise causing the presentation device to display at least a portion of the text corresponding to the potential edit point.

9. The non-transitory computer-readable medium of claim 8 wherein the operations further comprise causing the presentation device to display a visual attribute corresponding to a speaker.

10. The non-transitory computer-readable medium of claim 6 wherein the deep-learning neural network trained to output word occurrence probabilities comprises at least one of an N-gram language model, a neural network language model, or a recurrent neural network language model.

11. A method for producing a potential edit point for a video clip, the method comprising:

accessing an audio track for a video clip;

a step for determining, with a timestamp-to-text map and a deep-learning neural network trained to output word occurrence probabilities, a time-based probability and a word-based probability of at least one identified gap in text corresponding to a grammatical pause in speech represented in the audio track, the word-based probability based at least on part on word occurrence probabilities in relation to prior word;

combining the word-based probability and the time-based probability to provide a comparative probability of the at least one identified gap in the text corresponding to the grammatical pause;

identifying, based on the comparative probability relative to an input-adjustable grammatical threshold configured to determine a number of displayed edit points, a potential edit point for the video clip that corresponds to the grammatical pause in the speech represented in the audio track of the video clip;

displaying, on a presentation device, a marker indicating the potential edit point in the video clip;

receiving user input directed to an editing action at the marker; and performing the editing action at the marker in the video clip in response to the user input.

12. The method of claim 11 further comprising kernel-additive modeling the audio track of the video clip to identify audio sources to isolate the speech from among the audio sources.

13. The method of claim 11 further comprising producing an indexed list containing high, time-based probability gaps in the speech based on an average-length of gaps between words in the speech as determined at least in part from the timestamp-to-text map.

14. The method of claim 11 further comprising a step for causing the presentation device to display at least a portion of the text corresponding to the potential edit point.

15. The method of claim 14 further comprising a step for causing the presentation device to display a visual attribute corresponding to each of at least two speakers in the video clip.

16. The method of claim 11 wherein the deep-learning neural network trained to output word occurrence probabilities comprises at least one of an N-gram language model, a neural network language model, or a recurrent neural network language model.

* * * * *